March 16, 1965  R. J. STEELE  3,173,979
CUTTING MEANS FOR TUBULAR MATERIAL
Filed Aug. 20, 1962  2 Sheets-Sheet 1
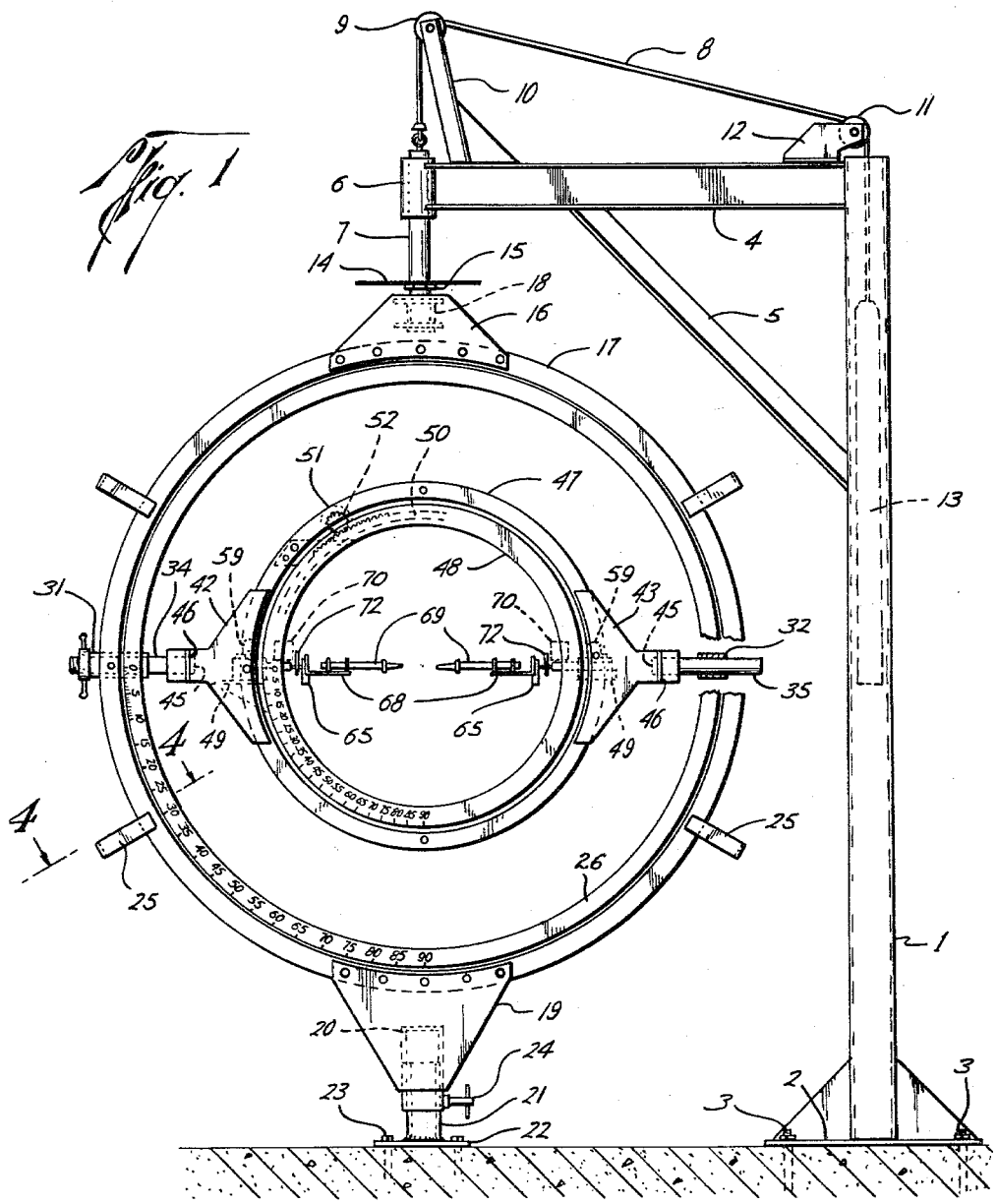
Richard J. Steele
INVENTOR.
BY Ranselar O. Wyatt
ATTORNEY

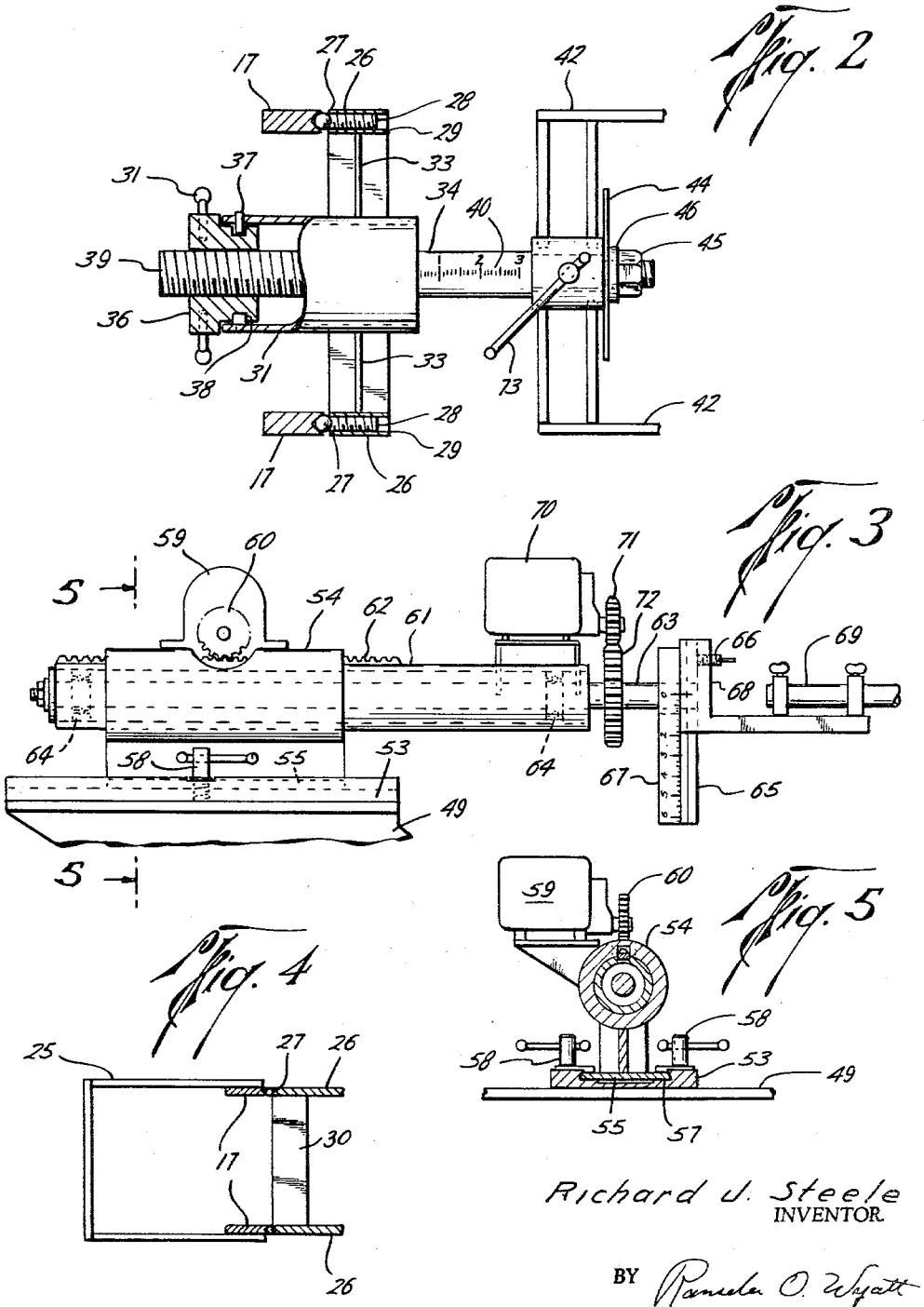

United States Patent Office 3,173,979
Patented Mar. 16, 1965

3,173,979
CUTTING MEANS FOR TUBULAR MATERIAL
Richard J. Steele, 2202 Harwell, Houston, Tex.
Filed Aug. 20, 1962, Ser. No. 217,913
4 Claims. (Cl. 266—23)

This invention relates to new and useful improvements in a cutting means for tubular material.

It is an object of this invention to provide a cutting means for tubular material having novel means for accurately and easily adjusting the machine to form the size and shape of the cut desired.

It is another object of the invention to provide a cutting device for tubular material having cutting torches movable into position for cutting openings at various angles and positions to provide a connecting surface for intersecting pipe and having means for rotating the means holding the cutting torches so that the torch holding means may be positioned at any point within a 360° radius thus permitting a cut off-center with relation to the longitudinal axis of the pipe being cut.

It is the common practive in tubular metal fabrication to prepare templates for the use of a cutting torch to form the cuts in the pipe of the desired shape and at the desired angles of intersection of pipe to be joined. In many instances, several cuts are made in a single length of material for various connections. It is an object of this invention to provide a device for quickly and easily forming these cuts and the desired bevels on the cuts without the necessity of templates or the like, including off center cuts, with relation to the longitudinal axis of the pipe being cut. Where a pipe is to enter the pipe being cut at a position off-center, with relation to the longitudinal axis of the pipe being cut, it is necessary in using the device covered by my former Patent No. 3,044,757 to turn the pipe in the rack, thus requiring an entire new set of calibrations and calculations. By providing the rotating outer ring, the cutting means may be positioned at any point in the 360° radius. In the device formerly patented, as above referred to, the only radial adjustments were at the 45–90° and the 180–360° positions. It is an object of this invention to provide means for adjusting the position of the torch carrying means radially with reference to the work piece in one operation and then adjusting the position of the torches in another as to their transverse axis and the bevel of cut, thus providing means for cutting off center and at a preselected bevel to accommodate an entrance of another pipe of smaller diameter at any desired angle.

It is another object of the invention to provide a cutting means for tubular material having novel means for vertical adjustment and having multiple means for adjusting the cutting medium at the proper position and angle so that the pipe to be cut remains on the rack and may be maintained against rotation so that the working point is constant and the cutting mechanism may revolve full 360 degrees around the pipe.

With the above and other objects in view, the invention has relation to certain novel features of construction, operation and arrangement of parts more particularly defined in the following specifications and illustrated in the accompanying drawings, wherein:

FIGURE 1 is a side elevational view of the device.
FIGURE 2 is an enlarged fragmentary view, partially in cross section.
FIGURE 3 is an enlarged fragmentary view of the torch carriage.
FIGURE 4 is a cross sectional view taken on the line 4—4 of FIGURE 1, and
FIGURE 5 is a cross sectional view of the torch carriage taken on the line 5—5 of FIGURE 3.

Referring now more particularly to the drawings, the numeral 1 designates the tubular upright support having the anchoring flange 2 and bolts 3, 3. A lateral arm 4 extends from the upper end of the support 1 and a suitable brace 5 extends from the arm 4 to the support 1. A tubular bearing 6 is mounted on the extended end of the arm 4 and through which the axle 7 extends. The axle 7 is maintained against rotation in the bearing by a suitable key and keyway. A flexible line 8 extends from the axle 7 over the shiv 9, which is mounted in the extended end of the shiv support 10, and over the shiv 11 which is mounted in the shiv support 12. The other end of the line 8 is secured to a suitable weight 13 which is suspended in the support 1.

A protractor 14 is mounted on the axle 7 and a protractor pointer 15 is mounted on the ring support 16 adjacent the protractor 14. Suspended from the axle 7 by a suitable collar 18 is the outer ring support 16 which is anchored to the outer rings 17, 17. The lower support 19, diametrically opposed to the ring support 16, is anchored to the outer rings 17, 17, and has the tubular sleeve 20 into which the lower axle 21 extends. The axle 21 has a suitable flange 22 and bolts 23, 23 to anchor the axle 21 fixedly in position. A manually operated clamp 24 releasably anchors the support 19 on the axle 21. Spacer brackets 25, 25 support the rings 17, 17 in spaced relation.

Intermediate rings 26, 26 are mounted in the outer rings 17, 17 the inside face of the rings 17, 17 being grooved and ball bearings 27, 27 seated therein and the desired resistance maintained by means of the bolts 28, 28 seated in the internally threaded ports 29, 29 spaced around the rings 26, 26. Suitable spacing bars 30, 30 maintain the rings 26, 26 in the desired position. One face on one of the rings 26, 26 is marked with graduated indicia for guidance in adjusting the rings 26, 26 in the rings 17, 17. When it is desired to lock the rings 26, 26 against rotation in the rings 17, 17 the bolts 28, 28 may be tightened to restrict the rings 26, 26 from rotation, or such other suitable clamping means between the rings 26, 26 and 17, 17 may be employed.

Mounted on the rings 26, 26 and extending outwardly between the outer rings 17, 17 are the inner ring axle housings 31, 32, the housings 31, 32 being maintained in position by the brace members 33, 33. The large inner ring support axles 34, 35 are horizontally movable in the housings 31, 32 and the axle 34 is keyed in the housing 31 to prevent rotation therein, the housing 31 having a plug 36 in the outwardly extended end thereof which is rotatably anchored in the housing 31 by the stud 37 which passes through the housing 31 and the lower end of which extends into the groove 38 in the plug 36, and the plug 36 has the axial threaded bore to receive the threaded portion 39 of the shaft 34. The shaft 34 has external threads from a point approximately midway between the ends thereof to the outwardly extended end, and has graduated indicia on its outer surface as 40 to guide the horizontal adjustment of the larger inner ring supports. Suitable handles 41, 41 are mounted in the plug 36 to aid in the manual rotation of the plug to accomplish a horizontal adjustment of the inner rings. The large inner ring supports 42, 43 are rotatably mounted on the reduced inner ends of the axles 34, 35 and a manually operated clamp 73 is mounted on the support 42 to lock the supports against rotation. A protractor 44 is mounted on the support 42 at its axial bore and rotates with the support 42. The inner ends of the axles 34, 35 are externally threaded and have the nut 45 and washer 46 mounted thereon maintaining the supports rotatably mounted on the supports 42, 43.

Mounted on the large inner ring supports 42, 43 are the large inner rings as 47 having the small inner rings as 48 mounted therein and spaced the desired distance apart in the same manner as the outer and intermediate rings 17, 26. The rings 47, 48 will be spaced a greater distance apart than the rings 17, 26 so that the torch platforms 49 may be mounted on the small inner rings 48 and extend outwardly between the large inner rings 47. The small inner rings 48 have a toothed rack 50 mounted on the inside wall of one of said rings and a suitable electric motor 51 mounted on and between the large inner rings rotates the gear 52 to rotate the inner rings 48. Suitable graduated indicia on the outer side wall of one of the small inner rings guides the adjustment of the small inner rings within the large inner rings.

Directly opposed torch supports are mounted on the small inner rings and each have a base member as 53 anchored to the platform 49 and the torch shaft housings as 54 have the foot members 55, having tapered side walls 56, which are slidably received in the longitudinal groove 57 of the base member 53. Suitable clamps, as 58, 58, are mounted in the base member 53 and bear against the foot member 55 to lock the housing 54 in position on the platform 49.

Mounted on the housing 54 is an electric motor 59 which rotates the gear 60. A slidable tubular shaft 61 extends through the housing 54 and has a toothed rack 62 on the upper surface thereof in mesh with the gear 60. A rotatable shaft 63 is mounted in and extends through the shaft 61 and is supported by suitable bearings 64, 64. A plate 65 is mounted on the inner end of the vertical shaft 61 and the torch support 68, is slidably mounted thereon, having suitable clamp means as 66 for locking the support 68 in the desired position on the plate 65. Graduated indicia 67 guides the adjustment of the support 68. An inwardly directed cutting torch 69 is mounted on each support 68. Mounted on the shaft 61 is an electric motor 70 having the gear 71 which is in mesh with the gear 72 on the shaft 62 for rotation of the shaft 62 and cutting torch support 68.

In operation, a tubular piece of material in which cuts are to be formed is placed on a suitable support (not shown) and extended through the small inner rings 48. The clamp 24 may be released and the large outer ring 17 manually moved vertically to center the material to be cut. If an angle cut is desired, the large outer ring 17 may be rotated, the protractor 14 guiding the user in positioning the ring 17. The clamp 24 may then be tightened, locking the ring 17 in position. The intermediate rings 26 may then be rotated within the large outer rings 17 to the position desired, the indicia on the outer surface of one of the rings 26 guiding this adjustment. The axles 34, 35 may then be horizontally adjusted by the rotation of the plug 36, the indicia 40 guiding the adjustment. The inner rings 47, 48 may then be further adjusted by rotation of the supports 42, 43, the protractor 44 guiding this adjustment, and the supports locked in the desired position by the clamp 73. The housings 54, 54 are then adjusted to the desired positions and the clamps 58 employed to lock the housings 54, 54 in the desired position. The motors 59, 59, which may be operated in unison or separately, as desired, are then activated to move the shaft 61 to the desired position and the torch supports 68, 68 adjusted, the indicia 67 guiding this adjustment. The motor 51 may be then activated to rotate the small inner rings 48, the indicia on the outer surface of the small inner ring guiding this adjustment. The torches 69 may then be ignited and the motors 70, 70 activated to rotate the torch supports 68, 68 and the cut performed.

Where the cut is for the purpose of connection into the material being cut, only one torch need be employed, however, if the cut is for the purpose of passing through the material being cut, both torches may be employed, identical cuts being made on each side of the material simultaneously. Each of the motors are independent, and may be independently operated or operated in unison, so that a great variety of cuts may be performed, such as a straight cut by setting all of the adjustments on zero and rotating the small inner rings, or an angular straight cut by rotating the large outer ring 17 to the desired angle and then rotating the small, inner ring. The center line with the large outer rings 17 remains constant with the center line of the material being cut, thus the same shape and size cuts may be repeatedly made with a fine degree of accuracy, and the shape and size of cuts may be varied, and each variation repeated with the same fine degree of accuracy by recording the settings from the indicia on the device for each cut, and resetting accordingly.

While the foregoing is considered a preferred form of the invention, it is by way of illustration only, the broad principle of the invention be defined by the appended claims.

What I claim is:

1. In a cutting device for tubular material, a supporting framework, large outer rings in a fixed spaced relation supported by said framework and having means for adjustment of their vertical position thereon, intermediate rings rotatably mounted in said large outer rings, rotatable and horizontally adjustable inner ring supports mounted in said intermediate rings, large inner rings mounted in said supports and small inner rings rotatably mounted in said large inner rings, cutting torch supports having cutting torches mounted thereon, horizontally adjustable and rotatably mounted in said small inner rings and means for selectively rotating said small inner rings and said torch supports.

2. In a cutting device for tubular material, a supporting framework, large outer rings in a fixed spaced relation supported by said framework and having means for adjustment of their vertical position thereon, intermediate rings rotatably mounted in said large outer rings, rotatable and horizontally adjustable inner ring supports mounted in said intermediate rings, large inner rings mounted in said supports and small inner rings rotatably mounted in said large inner rings, cutting torch supports having cutting torches mounted thereon, horizontally adjustable and rotatably mounted in said small inner rings and means for selectively rotating said small inner rings and said torch supports, and means for accurately adjusting the cutting torch to form the desired angle and shape of cut to be made with relation to the center line of the material being cut.

3. In a cutting device for tubular material, an upstanding tubular support, a lateral arm on the upper end of the support, shivs on said support, a flexible line having a weight on one end suspended in said support and an upper axle suspended from the other end, said axle extending through a sleeve mounted on the extended end of said arm, a large outer ring assembly mounted on said upper axle, the rings thereof being in fixed spaced relation, a lower axle housing on said large outer ring assembly diametrically opposed to said upper axle, a fixed lower axle extending into said axle housing, means for locking said housing against movement of said axle, an intermediate ring assembly rotatably mounted in said large outer ring assembly, a large inner ring assembly mounted in said intermediate ring assembly, and a small inner ring assembly rotatably mounted in said large inner ring assembly, means for horizontal adjustment of said large inner ring assembly, horizontally adjustable cutting torch supports mounted in said small inner ring assembly and cutting torches rotatably mounted on said cutting torch supports.

4. In a cutting device for tubular material, an upstanding tubular support, a lateral arm on the upper end of said support, shivs on said support, a flexible line having a weight on one end suspended in said support and an upper axle suspended from the other end, said axle extending through a sleeve mounted on the extended end of said arm, a large outer ring assembly mounted on said upper axle, the rings of said assembly being in fixed spaced relation, a lower axle housing on said large outer ring diametrically opposed to said upper axle, a fixed lower axle extending into said axle housing, means for locking said housing against movement on said axle, said large outer ring assembly having the inner periphery of the rings thereof grooved, ball bearings mounted in said grooves, an intermediate ring assembly rotatably mounted in said large outer ring assembly, studs extending through the rings of said inner ring assembly and bearing against said ball bearings, means spacing the rings of said large outer ring assembly apart and means spacing the rings of said intermediate ring assembly apart, a large inner ring assembly mounted in said intermediate ring assembly and a small inner ring assembly rotatably mounted in said large inner ring assembly, means for horizontal adjustment of said inner ring assembly, cutting torches adjustably mounted in said small inner ring assembly and means for positioning the angle and shape of the cut to be performed by said cutting torches.

References Cited by the Examiner

UNITED STATES PATENTS 3,044,757  7/62  Steele _____ 266—23

MORRIS O. WOLK, *Primary Examiner.*

JAMES H. TAYMAN, JR., *Examiner.*